United States Patent
Bally et al.

(10) Patent No.: US 10,715,795 B2
(45) Date of Patent: Jul. 14, 2020

(54) METHOD FOR DETERMINING A DIAGNOSTIC CONDITION OF A VEHICULAR VIDEO CONNECTION

(71) Applicant: MAGNA ELECTRONICS, INC., Auburn Hills, MI (US)

(72) Inventors: Nazar F. Bally, Sterling Heights, MI (US); Patrick Miller, Grand Blanc, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/246,626

(22) Filed: Jan. 14, 2019

(65) Prior Publication Data
US 2019/0149812 A1    May 16, 2019

Related U.S. Application Data

(63) Continuation of application No. 13/800,697, filed on Mar. 13, 2013, now Pat. No. 10,182,228.

(60) Provisional application No. 61/649,216, filed on May 18, 2012, provisional application No. 61/611,607, filed on Mar. 16, 2012.

(51) Int. Cl.
*H04N 17/00* (2006.01)
*H04N 21/414* (2011.01)
*H04N 21/442* (2011.01)

(52) U.S. Cl.
CPC ....... *H04N 17/00* (2013.01); *H04N 21/41422* (2013.01); *H04N 21/44231* (2013.01)

(58) Field of Classification Search
CPC ............. H04N 17/00; H04N 21/44231; H04N 21/41422

USPC .......................................................... 348/61
See application file for complete search history.

(56) References Cited

U.S. PATENT DOCUMENTS

| | | |
|---|---|---|
| 4,546,551 A | 10/1985 | Franks |
| 4,575,673 A | 3/1986 | Tedeschi et al. |
| 4,649,506 A | 3/1987 | Van den Heuvel |
| 4,862,594 A | 9/1989 | Schierbeek et al. |
| 4,937,945 A | 7/1990 | Schofield et al. |
| 4,953,305 A | 9/1990 | Van Lente et al. |

(Continued)

FOREIGN PATENT DOCUMENTS

JP    6530468 B2 *    11/2017

OTHER PUBLICATIONS

Kaplounovski, "PWM Circuit Uses Fuse to Sense Current," EDN Network, Dec. 1999.

*Primary Examiner* — Marnie A Matt
(74) *Attorney, Agent, or Firm* — Honigman LLP

(57) ABSTRACT

A method for determining a diagnostic condition of a vehicular video connection includes providing a video driver, a video cable, a video driver power supply, a current sensor and a microcontroller. The video driver is powered via the video driver power supply. Current flowing to the video driver from the video driver power supply is sensed via the current sensor. The microcontroller determines a current level sensed by the current sensor during operation of the video driver. An open circuit condition may be determined when the determined current level of the current flowing into the video driver falls below a predetermined quantity, and/or a short to battery condition may be determined when the determined current level of the current flowing into the video driver exceeds a predetermined quantity.

22 Claims, 2 Drawing Sheets

(56) References Cited

U.S. PATENT DOCUMENTS

| | | |
|---|---|---|
| 5,130,794 A | 7/1992 | Ritchey |
| 5,131,154 A | 7/1992 | Schierbeek et al. |
| 5,255,442 A | 10/1993 | Schierbeek et al. |
| 5,307,290 A | 4/1994 | Raviglione et al. |
| 5,530,240 A | 6/1996 | Larson et al. |
| 5,576,687 A | 11/1996 | Blank et al. |
| 5,632,092 A | 5/1997 | Blank et al. |
| 5,668,663 A | 9/1997 | Varaprasad et al. |
| 5,677,851 A | 10/1997 | Kingdon et al. |
| 5,699,044 A | 12/1997 | Van Lente et al. |
| 5,708,410 A | 1/1998 | Blank et al. |
| 5,724,187 A | 3/1998 | Varaprasad et al. |
| 5,727,221 A | 3/1998 | Walsh et al. |
| 5,737,226 A | 4/1998 | Olson et al. |
| 5,798,688 A | 8/1998 | Schofield |
| 5,802,727 A | 9/1998 | Blank et al. |
| 5,878,370 A | 3/1999 | Olson |
| 5,924,212 A | 7/1999 | Domanski |
| 5,941,997 A | 8/1999 | Greaves |
| 5,971,552 A | 10/1999 | O'Farrell et al. |
| 6,087,953 A | 7/2000 | DeLine et al. |
| 6,173,422 B1 | 1/2001 | Kimura et al. |
| 6,173,501 B1 | 1/2001 | Blank et al. |
| 6,222,460 B1 | 4/2001 | DeLine et al. |
| 6,243,003 B1 | 6/2001 | DeLine et al. |
| 6,278,377 B1 | 8/2001 | DeLine et al. |
| 6,329,925 B1 | 12/2001 | Skiver et al. |
| 6,420,975 B1 | 7/2002 | DeLine et al. |
| 6,477,464 B2 | 11/2002 | McCarthy et al. |
| 6,513,252 B1 | 2/2003 | Schierbeek |
| 6,642,851 B2 | 11/2003 | Deline et al. |
| 6,678,614 B2 | 1/2004 | McCarthy et al. |
| 6,690,268 B2 | 2/2004 | Schofield et al. |
| 6,693,524 B1 | 2/2004 | Payne |
| 6,946,978 B2 | 9/2005 | Schofield |
| 7,004,593 B2 | 2/2006 | Weller et al. |
| 7,167,796 B2 | 1/2007 | Taylor et al. |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,308,341 B2 | 12/2007 | Schofield et al. |
| 7,329,013 B2 | 2/2008 | Blank et al. |
| 7,338,177 B2 | 3/2008 | Lynam |
| 7,370,983 B2 | 5/2008 | DeWind et al. |
| 7,423,522 B2 | 9/2008 | O'Brien et al. |
| 7,446,650 B2 | 11/2008 | Scholfield et al. |
| 7,581,859 B2 | 9/2009 | Lynam |
| 7,626,749 B2 | 12/2009 | Baur et al. |
| 7,657,052 B2 | 2/2010 | Larson et al. |
| 7,773,353 B2 | 8/2010 | Uchida |
| 7,855,755 B2 | 12/2010 | Weller et al. |
| 8,194,132 B2 | 6/2012 | Dayan et al. |
| 10,182,228 B2 | 1/2019 | Bally et al. |
| 2001/0052777 A1 | 12/2001 | Belau et al. |
| 2003/0144779 A1 | 7/2003 | Obayashi et al. |
| 2004/0254652 A1 | 12/2004 | Ota et al. |
| 2005/0192727 A1 | 9/2005 | Shostak et al. |
| 2006/0050018 A1 | 3/2006 | Hutzel et al. |
| 2006/0061008 A1 | 3/2006 | Karner et al. |
| 2006/0125919 A1 | 6/2006 | Camilleri et al. |
| 2007/0057781 A1 | 3/2007 | Breed |
| 2008/0030311 A1 | 2/2008 | Dayan et al. |
| 2008/0122288 A1 | 5/2008 | Plante et al. |
| 2008/0265898 A1* | 10/2008 | Hernandez-Marti ......... G10K 11/002 324/366 |
| 2008/0266389 A1 | 10/2008 | DeWind et al. |
| 2009/0002903 A1 | 1/2009 | Uchida |
| 2009/0063674 A1 | 3/2009 | Brillhart et al. |
| 2009/0212543 A1* | 8/2009 | Heilmann ............ B60R 21/01 280/735 |
| 2010/0097519 A1 | 4/2010 | Byrne et al. |
| 2011/0068801 A1 | 3/2011 | Lenzie et al. |
| 2011/0130920 A1 | 6/2011 | Widmaier et al. |
| 2014/0266663 A1 | 9/2014 | Schlaps |

\* cited by examiner

METHOD FOR DETERMINING A DIAGNOSTIC CONDITION OF A VEHICULAR VIDEO CONNECTION

CROSS REFERENCE TO RELATED APPLICATIONS

The present application is a continuation of U.S. patent application Ser. No. 13/800,697, filed Mar. 13, 2013, now U.S. Pat. No. 10,182,228, which claims the filing benefit of U.S. provisional application, Ser. No. 61/649,216, filed May 18, 2012, and Ser. No. 61/611,607, filed Mar. 16, 2012, which are hereby incorporated herein by reference in their entireties.

FIELD OF INVENTION

The invention generally relates to the field of automotive or vehicular electronics, and more particularly to video diagnostic techniques.

BACKGROUND OF INVENTION

Automotive original equipment manufacturers (OEMs) require open-circuit, short to ground, and short to battery diagnostics be performed on all output drivers for electronic modules with vehicle communications bus support. For differential mode analog video applications, it is costly to implement these diagnostics on both the video+ and video− outputs. In addition, diagnostic circuits placed in line with the video wires could impact the integrity of the video signal.

SUMMARY OF INVENTION

Generally speaking, the invention senses the current flowing into the video output driver. This current provides valuable information for determining an open-circuit, a short to ground, or a short to battery condition. The invention thus provides a simpler, more cost effective, and relatively less intrusive method for diagnosing faults in the video output circuit than some methods of the prior art.

According to an aspect of the invention a method is provided for determining a diagnostic condition of a video cable connected to a display module in an automotive vehicle. The method includes providing a video signal; amplifying the video signal with a video driver for transmission over the video cable, where the video driver is powered by a driver power supply; sensing the current flowing into the video driver through the video driver power supply; determining the output voltage of the video driver; and determining a diagnostic condition of the video cable based on the value of the current flowing into the video driver and the output voltage of the video driver.

According to another aspect of the invention a system is provided for determining a diagnostic condition of a video cable connected to a display device or module in an automotive vehicle (such as a display device or video display screen that is disposed in the vehicle cabin and that is viewable by a driver of the vehicle when the driver is normally operating the vehicle). The system includes video processing circuitry providing a video signal and a video driver receiving the video signal and amplifying the signal for transmission over the video cable. The video driver is powered by a driver power supply. A current sensor is in connection with the driver power supply (such as a current sense resistor disposed in series with the driver power supply). A microcontroller is operatively connected to the current sensor to determine the current sensed by the current sensor. The microcontroller receives a short to battery input, such as may be output by the video driver. The microcontroller is operable to determine a diagnostic condition of the video cable based at least in part on the current sensed by the current sensor and the status of the short to battery input.

These and other objects, advantages, purposes and features of the present invention will become apparent upon review of the following specification in conjunction with the drawings.

DETAILED DESCRIPTION OF PREFERRED EMBODIMENTS

A driver assist system and/or vision system and/or object detection system and/or alert system for a vehicle may operate to capture images exterior of the vehicle and process the captured image data to detect objects at or near the vehicle and in the predicted path of the vehicle, such as to assist a driver of the vehicle in maneuvering the vehicle in a rearward direction. The system may provide a video image signal to a display device that is disposed in the vehicle cabin and viewable by a driver of the vehicle, so that the driver can view video images representative of the image data captured by the camera or cameras of the vehicle.

Figure 1:
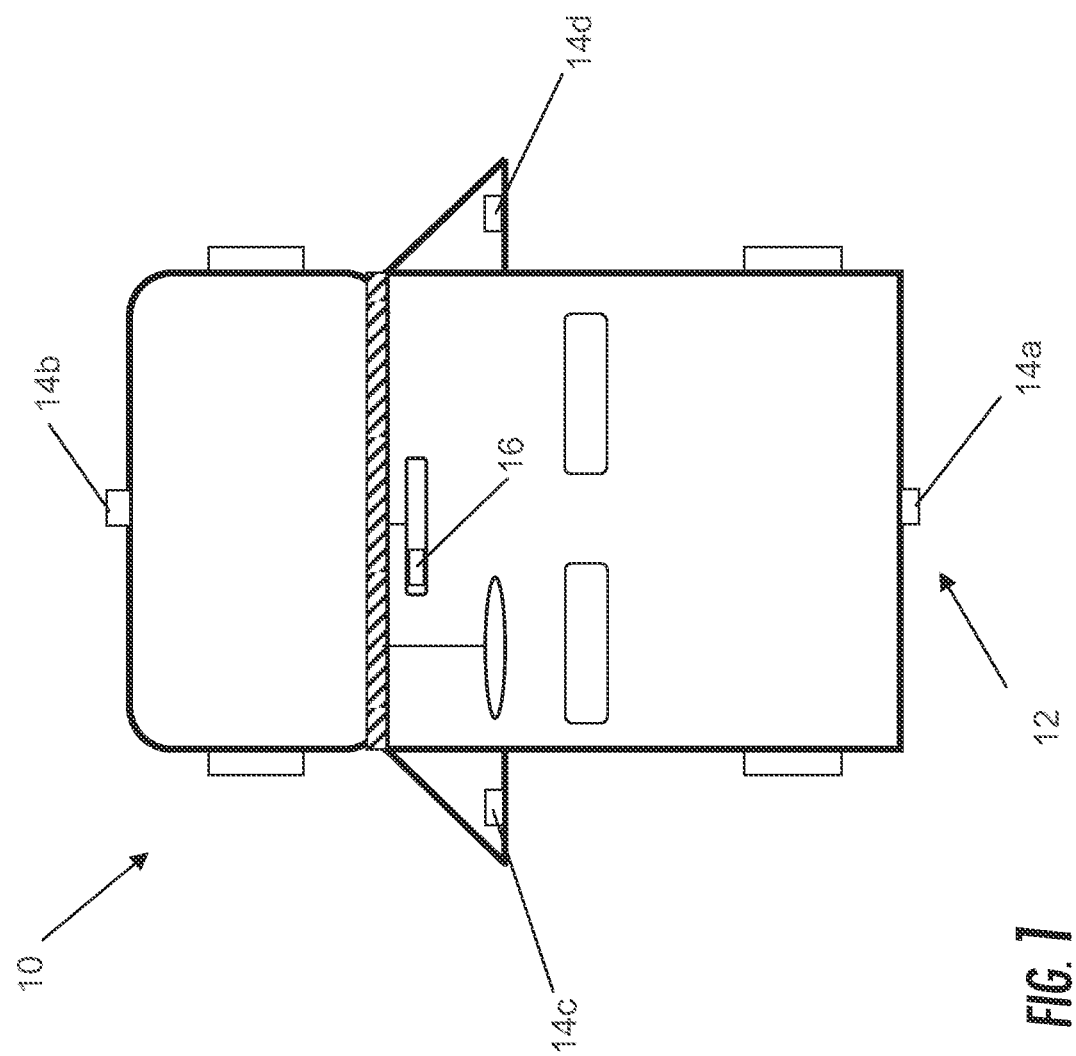
FIG. 1 is a plan view of a vehicle with a vision system and imaging sensors or cameras that provide video image data for communicating to an image processor and/or display device in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14*a* and/or a forwardly facing camera 14*b* at the front (or at the windshield) of the vehicle, and/or a sidewardly/rearwardly facing camera 14*c*, 14*b* at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like.

Figure 2:
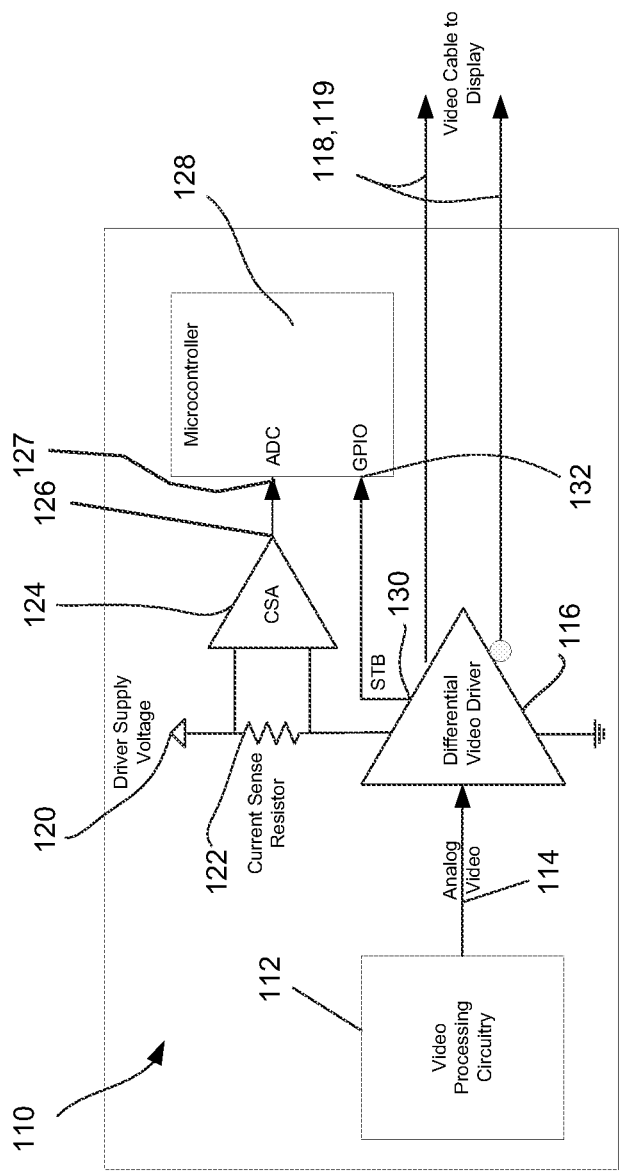
FIG. 2 is a circuit diagram showing a diagnostic system according to an embodiment of the invention.

FIG. 2 shows a video output diagnostic circuit 110 according to an embodiment of the invention. The circuit 110 includes conventional video processing circuitry 112 which may be utilized, for example, to process and display images captured by an automotive backup camera (such as camera 14*a* in FIG. 1). The video processing circuitry 114 provide an analog video output signal at line 114. The video output signal 114 is amplified for distribution via a differential video driver 116 and the differential output signal 118 is carried by a cable 119 to a display device module (such as video display screen 16 in FIG. 1) of the vehicle, such as a video display device or the like, such as a display module disposed at an interior cabin of the vehicle and viewable by the driver of the vehicle when the driver is normally operating the vehicle.

The video driver 116 is connected to a supply voltage 120, ultimately provided by the vehicle battery. A current sensor or current sense resistor 122 is disposed in series in the power supply path (between the supply voltage and the video driver), and the two terminals of the current sense resistor 122 are fed to differential inputs of a current sense amplifier 124. The output 126 of the current sense amplifier (CSA) 124 is fed to an analog to digital conversion (ADC) port 127 of a control or control circuit or microcontroller 128.

The microcontroller 128 may be a microcontroller dedicated for diagnostic purposes or more preferably may be a microcontroller that is used for other purposes such as a microcontroller that forms part of the video control system including communication circuitry that is used to communicate with a main vehicle controller over a network bus or communication system of the vehicle, such as a controller area network (CAN) or vehicle system bus or the like.

The differential video driver 116 features a short to battery (STB) status digital output 130. This output 130, which is triggered when the output voltage of the differential output signal 118 exceeds the supply voltage, is fed to a general purpose digital input 132 of the microcontroller 128.

An example of a commercially available differential video driver having an STB status output that may be suitable for application of this type is Analog Devices part no. ADA4433-1.

A fault on video cable 119 is detected by a change in current through the supply 120 to the output video driver 116 by the current sense resistor 122. The voltage across this resistor 122 is amplified by the current sense amplifier 124 and passed to the analog to digital conversion port 127 of the microcontroller 128, which reads the value of the voltage across the resistor 122 and thus the current therethrough. If the microcontroller reads a value of no current or little (less than a predetermined) current, this indicates an open circuit on the output cable 119 or lack of signal available at the output video amplifier 116. If the microcontroller 128 reads a current value greater than a predetermined nominal value, this indicates a short or partial short to ground condition. If the short to battery status output 130 is triggered, then the microcontroller 128 proceeds to a next step on the presumption that the short is a short to battery condition. Thus, if the current value is greater than the predetermined nominal value and the short to battery status output 130 is not triggered, the microcontroller 128 proceeds to a next step on the presumption that a short to ground condition exists.

The diagnostic condition is communicated by the microcontroller 128 over the controller area network to the vehicle controller.

The vision system of the present invention thus receives an input from video processing circuitry and provides an output to a display for displaying images, such as video images or the like, which may be captured by one or more cameras or imaging sensors of the vehicle, for viewing by the driver of the vehicle while the driver is normally operating the vehicle. The system senses the current flowing into the video output driver, and based on sensing of the current, the system can determine if there is an open-circuit, a short to ground, or a short to battery condition. The diagnostic condition determined by the system or microcontroller may be communicated to a vehicle controller or the like, such as via a communications network of the vehicle, such as via a controller area network of the vehicle or the like.

Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published on Feb. 7, 2013 as International Publication No. WO 2013/019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published on Nov. 1, 2012 as International Publication No. WO 2012/145822, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2013/022119, filed Jan. 18, 2013, and published Jul. 25, 2013 as International Publication No. WO 2013/

109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Optionally, and desirably, the system of the present invention utilizes an image-based sensor or camera and image processing of image data captured by the camera. The system and/or camera of the vehicle includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580; and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in PCT Application No. PCT/US2012/066571, filed Nov. 27, 2012, and published Jun. 6, 2013 as International Publication No. WO 2013/081985, which is hereby incorporated herein by reference in its entirety.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, an array of a plurality of photosensor elements arranged in at least about 640 columns and 480 rows (at least about a 640×480 imaging array and more preferably a mega-pixel array that may provide high definition imaging), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published Feb. 7, 2013 as International Publication No. WO 2013/019707, and/or PCT Application No. PCT/US2012/048110, filed Jul. 25, 2012, and published Jan. 31, 2013 as International Publication No. WO 2013/016409, and/or PCT Application No. PCT/CA2012/000378, filed Apr. 25, 2012, and published Nov. 1, 2012 as International Publication No. WO 2012/145822, and/or PCT Application No. PCT/US2012/056014, filed Sep. 19, 2012, and published Mar. 28, 2013 as International Publication No. WO 2013043661, and/or PCT Application No. PCT/US12/57007, filed Sep. 25, 2012, and published Apr. 4, 2013 as International Publication No. WO 2013/048994, and/or PCT Application No. PCT/US2012/

061548, filed Oct. 24, 2012, and published May 2, 2013 as International Publication No. WO 2013/063014, and/or PCT Application No. PCT/US2012/062906, filed Nov. 1, 2012, and published May 10, 2013 as International Publication No. WO 2013/067083, and/or PCT Application No. PCT/US2012/063520, filed Nov. 5, 2012, and published May 16, 2013 as International Publication No. WO 2013/070539, and/or PCT Application No. PCT/US2012/064980, filed Nov. 14, 2012, and published May 23, 2013 as International Publication No. WO 2013/074604, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2012/071219, filed Dec. 21, 2012, and published Jul. 11, 2013 as International Publication No. WO 2013/103548, and/or PCT Application No. PCT/US2013/022119, filed Jan. 18, 2013, and published Jul. 25, 2013 as International Publication No. WO 2013/109869, and/or PCT Application No. PCT/US2012/066570, filed Nov. 27, 2012, and published Jun. 6, 2013 as International Publication No. WO 2013/081984, and/or PCT Application No. PCT/US2012/066571, filed Nov. 27, 2012, and published Jun. 6, 2013 as International Publication No. WO 2013/081985, and/or PCT Application No. PCT/US2012/068331, filed Dec. 7, 2012, and published Jun. 13, 2013 as International Publication No. WO 2013/086249, and/or PCT Application No. PCT/US2013/027342, filed Feb. 22, 2013, and published Aug. 9, 2013 as International Publication No. WO 2013/126715, and/or U.S. patent application Ser. No. 13/785,099, filed Mar. 5, 2013, now U.S. Pat. No. 9,565,342; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-0002873, and/or U.S. provisional application, Ser. No. 61/736,104, filed Dec. 12, 2012; Ser. No. 61/736,103, filed Dec. 12, 2012; Ser. No. 61/735,314, filed Dec. 10, 2012; Ser. No. 61/734,457, filed Dec. 7, 2012; Ser. No. 61/733,598, filed Dec. 5, 2012; Ser. No. 61/733,093, filed Dec. 4, 2012; Ser. No. 61/727,912, filed Nov. 19, 2012; Ser. No. 61/727,911, filed Nov. 19, 2012; Ser. No. 61/727,910, filed Nov. 19, 2012; Ser. No. 61/718,382, filed Oct. 25, 2012; Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/676,405, filed Jul. 27, 2012; Ser. No. 61/666,146, filed Jun. 29, 2012; Ser. No. 61/648,744, filed May 18, 2012; Ser. No. 61/624,507, filed Apr. 16, 2012; Ser. No. 61/616,126, filed Mar. 27, 2012; Ser. No. 61/613,651, filed Mar. 21, 2012, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published Jan. 31, 2013 as International Publication No. WO 2013/016409, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. Nos. 8,542,451, and/or 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. patent application Ser. No. 11/239,980, filed Sep. 30, 2005, now U.S. Pat. No. 7,881,496, and/or U.S. provisional application, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Those skilled in the art will understand that a variety of modifications may be made to the preferred embodiments described above without departing from the fair meaning of the appended claims.

The invention claimed is:

1. A method for determining a diagnostic condition of a vehicular video connection, the method comprising:
   providing a video driver, a video cable and a video driver power supply;
   providing a current sensor and a microcontroller;
   powering the video driver via the video driver power supply;
   sensing, via the current sensor, current flowing to the video driver from the video driver power supply;
   determining, via the microcontroller, a current level sensed by the current sensor during operation of the video driver; and
   determining an open circuit condition when the determined current level of the current flowing into the video driver falls below a predetermined quantity.

2. The method of claim 1, comprising determining a short to battery condition when the determined current level of the current flowing into the video driver exceeds a predetermined quantity and an output voltage of the video driver is higher than a voltage of the video driver power supply.

3. The method of claim 1, comprising determining a short to ground condition when the determined current level of the current flowing into the video driver exceeds a predetermined quantity and an output voltage of the video driver is not higher than a voltage of the video driver power supply.

4. The method of claim 1, comprising determining a diagnostic condition of the video cable based at least in part on the determined current level of the current flowing into the video driver.

5. The method of claim 1, comprising determining a diagnostic condition of the video cable based at least in part on an output voltage of the video driver.

6. The method of claim 1, comprising determining a diagnostic condition of the video cable based at least in part on a determined short to battery condition that is triggered responsive to an output voltage of the video driver exceeding a supply voltage of the video driver power supply.

7. The method of claim 1, comprising communicating, via the microcontroller being part of a video control system including communication circuitry, with a vehicle controller.

8. The method of claim 1, comprising (i) providing a video display at a cabin of a vehicle that is viewable by a driver of the vehicle when the driver is normally operating the vehicle and (ii) displaying video images responsive to a video signal provided over the video cable.

9. A method for determining a diagnostic condition of a vehicular video connection, the method comprising:
   providing a video driver, a video cable and a video driver power supply;
   providing a current sensor and a microcontroller;
   powering the video driver via the video driver power supply;
   sensing, via the current sensor, current flowing to the video driver from the video driver power supply;
   determining, via the microcontroller, a current level sensed by the current sensor during operation of the video driver; and
   determining a short to battery condition when the determined current level of the current flowing into the video driver exceeds a predetermined quantity and an output voltage of the video driver is higher than a voltage of the video driver power supply.

10. The method of claim 9, comprising determining a short to ground condition when the determined current level of the current flowing into the video driver exceeds a predetermined quantity and an output voltage of the video driver is not higher than a voltage of the video driver power supply.

11. The method of claim 10, comprising determining an open circuit condition when the determined current level of the current flowing into the video driver falls below a predetermined quantity.

12. The method of claim 9, comprising determining a diagnostic condition of the video cable based at least in part on the determined current level of the current flowing into the video driver.

13. The method of claim 9, comprising determining a diagnostic condition of the video cable based at least in part on an output voltage of the video driver.

14. The method of claim 9, comprising determining a diagnostic condition of the video cable based at least in part on a determined short to battery condition that is triggered responsive to an output voltage of the video driver exceeding a supply voltage of the video driver power supply.

15. The method of claim 9, comprising communicating, via the microcontroller being part of a video control system including communication circuitry, with a vehicle controller.

16. The method of claim 9, comprising (i) providing a video display at a cabin of a vehicle that is viewable by a driver of the vehicle when the driver is normally operating the vehicle and (ii) displaying video images responsive to a video signal provided over the video cable.

17. A method for determining a diagnostic condition of a vehicular video connection, the method comprising:
   providing a video driver, a video cable and a video driver power supply;

providing a current sensor and a microcontroller;

powering the video driver via the video driver power supply;

sensing, via the current sensor, current flowing to the video driver from the video driver power supply;

determining, via the microcontroller, a current level sensed by the current sensor during operation of the video driver; and determining a short to ground condition when the determined current level of the current flowing into the video driver exceeds a predetermined quantity and an output voltage of the video driver is not higher than a voltage of the video driver power supply.

18. The method of claim 17, comprising determining a diagnostic condition of the video cable based at least in part on the determined current level of the current flowing into the video driver.

19. The method of claim 17, comprising determining a diagnostic condition of the video cable based at least in part on an output voltage of the video driver.

20. The method of claim 17, comprising determining a diagnostic condition of the video cable based at least in part on a determined short to battery condition that is triggered responsive to an output voltage of the video driver exceeding a supply voltage of the video driver power supply.

21. The method of claim 17, comprising communicating, via the microcontroller being part of a video control system including communication circuitry, with a vehicle controller.

22. The method of claim 17, comprising (i) providing a video display at a cabin of a vehicle that is viewable by a driver of the vehicle when the driver is normally operating the vehicle and (ii) displaying video images responsive to a video signal provided over the video cable.

\* \* \* \* \*